US010853468B2

(12) United States Patent
Taveau et al.

(10) Patent No.: US 10,853,468 B2
(45) Date of Patent: Dec. 1, 2020

(54) APPLICATIONS LOGIN USING A MECHANISM RELATING SUB-TOKENS TO THE QUALITY OF A MASTER TOKEN

(71) Applicant: PAYPAL, INC., San Jose, CA (US)

(72) Inventors: Sebastien Ludovic Jean Taveau, Redwood City, CA (US); Upendra S. Mardikar, San Jose, CA (US)

(73) Assignee: PAYPAL, INC., San Jose, CA (US)

(*) Notice: Subject to any disclaimer, the term of this patent is extended or adjusted under 35 U.S.C. 154(b) by 0 days.

(21) Appl. No.: 16/680,473

(22) Filed: Nov. 11, 2019

(65) Prior Publication Data

US 2020/0151313 A1    May 14, 2020

Related U.S. Application Data

(63) Continuation of application No. 16/196,847, filed on Nov. 20, 2018, now Pat. No. 10,474,806, which is a
(Continued)

(51) Int. Cl.
*G06F 21/34* (2013.01)
*G06Q 20/40* (2012.01)
(Continued)

(52) U.S. Cl.
CPC .............. *G06F 21/34* (2013.01); *G06F 21/30* (2013.01); *G06F 21/335* (2013.01); *G06F 21/41* (2013.01);
(Continued)

(58) Field of Classification Search
CPC ........ G06F 21/34; G06F 21/30; G06F 21/335; G06F 21/41
(Continued)

(56) References Cited

U.S. PATENT DOCUMENTS 6,070,141 A * 5/2000 Houvener ............ G06Q 20/206
  705/76
6,279,111 B1 * 8/2001 Jensenworth ......... G06F 21/335
  713/159
(Continued)

FOREIGN PATENT DOCUMENTS

CN    1938655       3/2007
CN    101427268    5/2009
(Continued)

OTHER PUBLICATIONS

European Patent Office, Communication—Extended Search Report dated Jan. 20, 2016, Application No. 12863382.3, 7 Pages.
(Continued)

*Primary Examiner* — Dant B Shaifer Harriman
(74) *Attorney, Agent, or Firm* — Haynes and Boone, LLP

(57) ABSTRACT

Methods and systems allow a user to log in to a device so that a number of apps become accessible on the device without the user repeatedly logging in to each different app as the user launches multiple apps. A mechanism of providing a master token with a quality score and providing sub-tokens for each app that can use the sub-token and the score quality to evaluate the level of security provided by the initial login allows each app to skip its own login process and provides a level of enhanced efficiency and convenience for the user. A method includes authenticating a user; creating a master token on the user device; creating a sub-token of the master token for an app launched on the device; the app skipping the login process of the app in response to the sub-token so that the app proceeds directly to validating a transaction.

20 Claims, 3 Drawing Sheets

Related U.S. Application Data continuation of application No. 14/828,239, filed on Aug. 17, 2015, now Pat. No. 10,133,858, which is a continuation of application No. 14/178,716, filed on Feb. 12, 2014, now Pat. No. 9,111,083, which is a continuation of application No. 13/340,521, filed on Dec. 29, 2011, now Pat. No. 8,689,310.

(51) Int. Cl.

| | | |
|---|---|---|
| *G06F 21/33* | (2013.01) | |
| *G06F 21/41* | (2013.01) | |
| *H04L 29/06* | (2006.01) | |
| *H04L 9/32* | (2006.01) | |
| *G06Q 20/12* | (2012.01) | |
| *G06Q 20/20* | (2012.01) | |
| *G06Q 20/38* | (2012.01) | |
| *G06F 21/30* | (2013.01) | |
| *G06F 21/62* | (2013.01) | |

(52) U.S. Cl.
CPC ........... *G06Q 20/12* (2013.01); *G06Q 20/127* (2013.01); *G06Q 20/20* (2013.01); *G06Q 20/382* (2013.01); *G06Q 20/405* (2013.01); *G06Q 20/4014* (2013.01); *G06Q 20/40145* (2013.01); *H04L 9/3226* (2013.01); *H04L 9/3228* (2013.01); *H04L 9/3231* (2013.01); *H04L 63/0807* (2013.01); *H04L 63/0815* (2013.01); *H04L 63/0861* (2013.01); *G06F 21/629* (2013.01); *G06F 2221/2113* (2013.01); *G06F 2221/2137* (2013.01)

(58) Field of Classification Search
USPC .......................................................... 705/44
See application file for complete search history.

(56) References Cited

U.S. PATENT DOCUMENTS

| | | | |
|---|---|---|---|
| 7,437,726 B2 | 10/2008 | Beaumont | |
| 7,720,864 B1 * | 5/2010 | Muth | G06F 16/128 |
| | | | 707/785 |
| 8,032,922 B2 * | 10/2011 | Bhatia | G06F 21/6218 |
| | | | 726/2 |
| 8,533,796 B1 * | 9/2013 | Shenoy | G06F 21/335 |
| | | | 726/6 |
| 8,635,662 B2 * | 1/2014 | Lang | G06F 21/31 |
| | | | 726/1 |
| 9,124,575 B2 * | 9/2015 | Friedmann | H04L 63/0807 |
| 9,635,028 B2 * | 4/2017 | Shepard | G06F 21/44 |
| 2001/0027527 A1 | 10/2001 | Khidekel et al. | |
| 2004/0006706 A1 * | 1/2004 | Erlingsson | G06F 21/51 |
| | | | 726/30 |
| 2005/0210270 A1 * | 9/2005 | Rohatgi | G06F 21/32 |
| | | | 713/186 |
| 2006/0036553 A1 * | 2/2006 | Gupta | G06Q 20/0855 |
| | | | 705/52 |
| 2006/0110011 A1 * | 5/2006 | Cohen | G07C 9/37 |
| | | | 382/115 |
| 2007/0192619 A1 | 8/2007 | Gifford et al. | |
| 2008/0031447 A1 * | 2/2008 | Geshwind | H04L 9/3226 |
| | | | 380/46 |
| 2008/0148351 A1 | 6/2008 | Bhatia et al. | |
| 2008/0168539 A1 * | 7/2008 | Stein | H04L 63/0815 |
| | | | 726/5 |
| 2008/0313707 A1 * | 12/2008 | Jain | H04L 63/08 |
| | | | 726/2 |
| 2009/0132813 A1 | 5/2009 | Schibuk | |
| 2009/0192944 A1 * | 7/2009 | Sidman | G06Q 20/401 |
| | | | 705/75 |
| 2009/0254978 A1 | 10/2009 | Rouskov et al. | |
| 2009/0292927 A1 | 11/2009 | Wenzel et al. | |
| 2010/0122333 A1 | 5/2010 | Noe | |
| 2010/0212004 A1 * | 8/2010 | Fu | H04L 63/08 |
| | | | 726/9 |
| 2011/0016534 A1 * | 1/2011 | Jakobsson | H04L 67/22 |
| | | | 726/28 |
| 2011/0179477 A1 * | 7/2011 | Starnes | H04L 63/12 |
| | | | 726/9 |
| 2011/0276797 A1 * | 11/2011 | Pedlow | H04N 21/8586 |
| | | | 713/151 |
| 2012/0110318 A1 * | 5/2012 | Stone | G06F 21/41 |
| | | | 713/150 |
| 2012/0291114 A1 * | 11/2012 | Poliashenko | H04L 9/321 |
| | | | 726/8 |
| 2013/0086210 A1 * | 4/2013 | Yiu | H04L 63/0815 |
| | | | 709/217 |
| 2013/0174244 A1 * | 7/2013 | Taveau | G06Q 20/405 |
| | | | 726/9 |
| 2013/0326614 A1 * | 12/2013 | Truskovsky | H04L 9/3213 |
| | | | 726/19 |
| 2014/0002238 A1 * | 1/2014 | Taveau | G07C 9/257 |
| | | | 340/5.53 |
| 2016/0004852 A1 * | 1/2016 | McEvoy | H04L 63/08 |
| | | | 726/7 |
| 2016/0036790 A1 * | 2/2016 | Shastry | H04L 63/0876 |
| | | | 713/168 |
| 2016/0212115 A1 * | 7/2016 | Hamlin | G06F 21/32 |
| 2018/0219891 A1 * | 8/2018 | Jain | H04L 63/1425 |

FOREIGN PATENT DOCUMENTS

| | | |
|---|---|---|
| JP | 2003256376 | 9/2003 |
| JP | 2006514502 | 4/2006 |
| JP | 2007094548 | 4/2007 |
| JP | 2008083759 | 4/2008 |
| JP | 2011133951 | 7/2011 |
| WO | WO 2004/093381 | 10/2004 |
| WO | WO 2011/006790 | 1/2011 |

OTHER PUBLICATIONS

Japanese Patent Office, Notice of Rejection Ground dated Oct. 27, 2015, Application No. 2014-550434, 6 Pages.

International Search Report and Written Opinion dated Mar. 5, 2013 in PCT/US12/71673.

* cited by examiner

APPLICATIONS LOGIN USING A MECHANISM RELATING SUB-TOKENS TO THE QUALITY OF A MASTER TOKEN

CROSS REFERENCE TO RELATED APPLICATIONS

This application is a continuation of U.S. patent application Ser. No. 16/196,847, filed Nov. 20, 2018, which is a continuation of U.S. patent application Ser. No. 14/828,239, filed Aug. 17, 2015, now U.S. Pat. No. 10,133,858, issued Dec. 10, 2015, which is a continuation of U.S. patent application Ser. No. 14/178,716, filed Feb. 12, 2014, issued Aug. 18, 2015 as U.S. Pat. No. 9,111,083 which is a continuation of U.S. patent application Ser. No. 13/340,521, filed Dec. 29, 2011, issued Apr. 1, 2014 as U.S. Pat. No. 8,689,310, each of which is incorporated by reference herein in its entirety.

BACKGROUND

Technical Field

The present disclosure generally relates to security for communications conducted over a network using a handheld mobile or other consumer electronic device and, more particularly, to a security mechanism for logging in to apps executing on the device that provides user convenience through either fast login or avoiding repetitive logging in when using multiple apps on the device.

Related Art

Many compact, handheld consumer electronic devices such as mobile phones with mobile web browsers, smart phones, and electronic note pads allow the use of various applications programs, or "apps", for a great variety of types of communications including, for example, texting, social networking, email, and electronic commerce, which generally refers to the buying and selling of products or services over electronic networks such as the Internet and other computer networks using electronic devices. Apps used for these various types of communication may benefit from and even rely on some form of security in terms of not allowing unauthorized access to use of the app, and thus may require some form of login. For example, a bank or other financial service provider may provide an app for use on a mobile device that allows access to the device user's account at the financial service provider. Similarly, in the case of email and social networking, for example, it can be desirable and important to prevent impersonation of the owner of the email account or the owner's social networking page. Thus, many of the apps on a user's device may require some form of secure login to authenticate the user of the app. When many apps are being used at one time on a single device, the user may encounter some inconvenience (e.g., delay in accomplishing desired tasks) from multiple or repetitive logins when switching from one app to another or when returning to a previously used app that has already logged the user out.

SUMMARY

According to one or more embodiments of the present invention, methods and systems are provided for allowing a user to log in to a device in such a way that a number of apps become accessible on the device without the user having to repeatedly log in to each different app as the user launches multiple apps. A mechanism is disclosed of providing a master token with a quality score and providing sub-tokens for each app that can use the sub-token and the score quality to evaluate the level of security provided by the initial login, allowing the app to shorten or skip its own login process and providing a level of enhanced efficiency and convenience for the user.

In one or more embodiments, a system includes a processor and a computer-readable medium having computer readable code for instructing the processor to perform a method, the method comprising: authenticating a user via a user device communicating over a network with a service provider; creating a master token on the user device; checking if the master token is present on the device; creating a sub-token of the master token for an app on the device launched by the user; launching the app includes jumping over the login process by the app in response to the sub-token so that the app proceeds directly to validating a transaction; and validating the transaction based on information included in the sub-token.

These and other aspects of the present disclosure will be more readily apparent from the detailed description of the embodiments set forth below taken in conjunction with the accompanying drawings.

Figure 1:
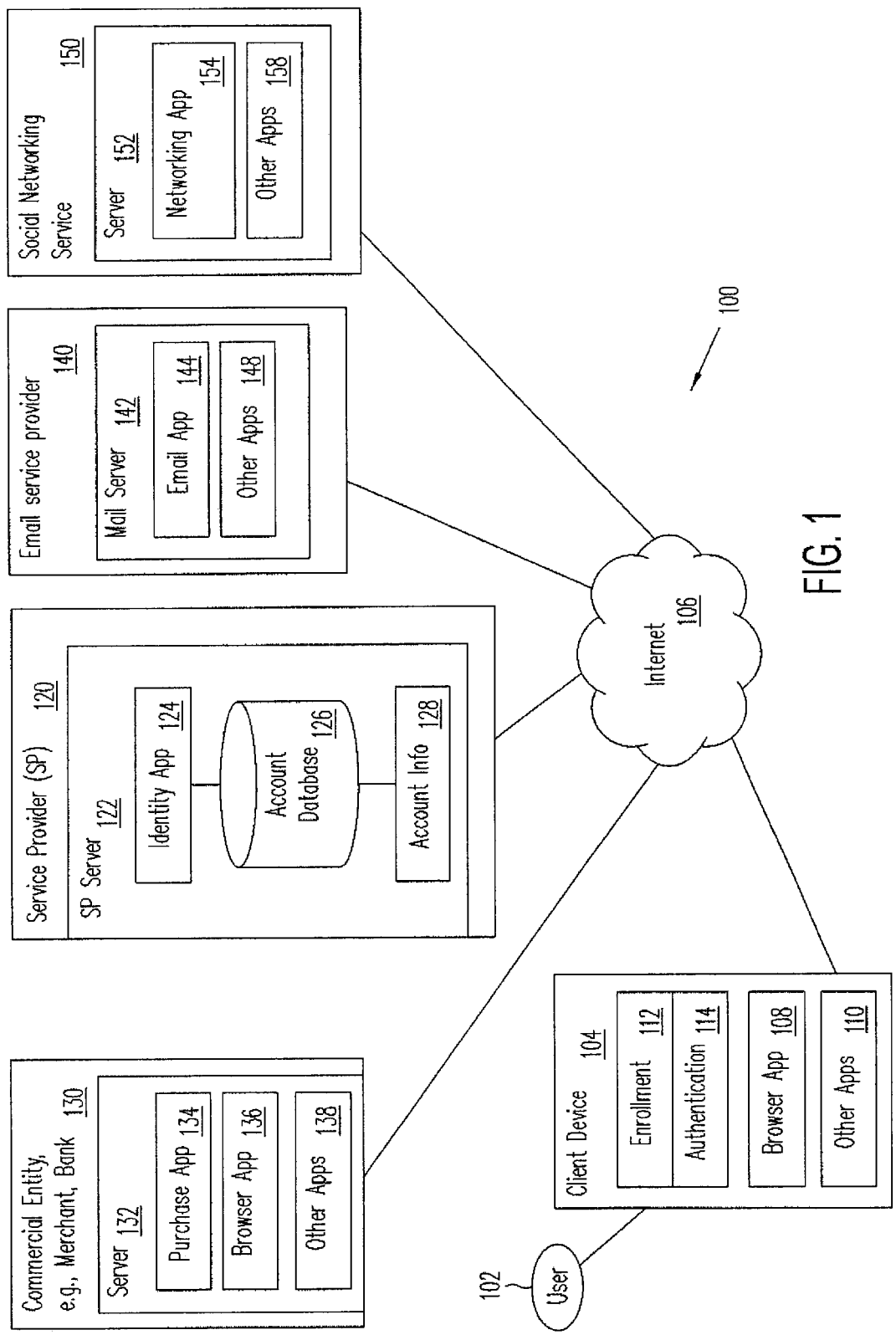
FIG. 1 is a system diagram illustrating a system for score based fast login using sub-tokens for login to multiple apps and communicating over a network in accordance with one or more embodiments.

Embodiments of the invention and their advantages are best understood by referring to the detailed description that follows.

DETAILED DESCRIPTION

According to one or more embodiments of the present invention, methods and systems are provided for securely logging in to a device and communicating over a network in such a way that login to the device provides authentication that can be used to facilitate subsequent logins (e.g., to one or more apps) that can significantly improve the user experience. In other words, a secure device binding may provide user convenience through avoiding repetitive logging in when changing apps (application programs). In one embodiment, a user and a device may be strongly authenticated at an initial login, e.g., using biometric technology. As a result of the strong authentication, a temporary master token may be generated that other applications can leverage by the use of sub-tokens to provide log in security to the app without the app requiring its own login from the user. Thus, the user may be allowed to log in to a device in such a way that a number of apps become accessible on the device without the user having to repeatedly log in to each different app as the user launches multiple apps. Avoiding multiple logins or even login for just one app, according to some embodiments, may allow reducing time latency when checking out from online shopping, service provider payments at a point-of-sale (POS), and also may help solve off-the-grid transactions. In one embodiment, biometrics may, thus, be used not so much only to "secure" the user but also to provide the user time saving convenience.

In one or more embodiments, a mechanism is disclosed of providing a master token with a quality score and providing sub-tokens for one or more apps (e.g., each app has its own sub-token) that can use the sub-token and the score quality to evaluate the level of security provided by the initial login, allowing the app to securely shorten or skip its own login process and providing a level of enhanced efficiency and convenience for the user. In one embodiment, the same app which generates the master token may also generate the sub-token for any other app, interfacing with the app via an application programming interface (API.) of the app. In another embodiment, each app may generate its own sub-token, accessing the master token via an API. In one embodiment, the master token may be a root token of a tree (data structure) of tokens including the sub-tokens linked to the root token. As a result, when the user accesses one or more apps on the mobile device, there may be no need to go through a login process in the app. A login may nevertheless be required in certain situations, such as a high dollar amount purchase, based on risk parameters pre-determined by the service provider.

In one embodiment, a mobile device is bound, or undergoes binding, to an account—for example, with a service provider, merchant, bank, or other commercial entity—to enable a security features of apps on the device so that customers do not always have to enter their password when going through a shopping checkout or other financial transaction process with an app on a known mobile device. This device binding can serve as the basis for functionality such as skipping redundant login in various payment flows, risk management processes and models, and other device-based logic. In one embodiment, a device may be bound during an initial login, for example, through device interrogation to get a device identification (ID) which may include one or more device identifiers.

Device binding may be based on biometric technology (e.g., finger print swipe, retinal scan, voiceprint) and, either alternatively or in addition, on a unique device identifier which is present on the device (e.g., international mobile equipment (IMEI) number, name of device, various date modified checks (e.g., a firmware new version with a different time stamp from the previously installed version), and other variables, or a combination of identifiers). Use of such a device-unique identifier may enable the service provider to remember a user across apps on a device if the user wants to skip subsequent logins on the device. Multiple mobile devices may be bound to a single account.

FIG. 1 illustrates a system 100, in accordance with one or more embodiments, for score based fast login using sub-tokens for login to multiple apps and making a payment (or other financial transaction needing security) by a user 102 using a mobile device 104 (also referred to as "user device") to communicate over a network 106 (e.g., the Internet) to a commercial entity (e.g., merchant 130) using a service provider (SP) 120. The service provider 120 may be a payment provider or other provider of financial services, such as PayPal, Inc. of San Jose, Calif. Network 106 may be implemented as a single network or a combination of multiple networks. For example, in various embodiments, network 106 may include one or more intranets, landline networks, wireless networks, or other appropriate types of communication networks including the Internet. In another example, the network may comprise a wireless telecommunications network (e.g., cellular phone network) adapted to communicate with other communication networks such as the Internet.

Mobile device 104 may be, for example, a laptop, smart phone, tablet, or other mobile computing or communication devices, televisions with internet connection, set-top boxes or other network-connected devices. Mobile device 104, which may function as a client (and may also be referred to as "client device" 104) may be implemented using any appropriate combination of hardware and software configured for wired or wireless communication over network 106. For example, mobile device 104 may be implemented as a personal computer of user 102 (e.g., a client or customer) in communication with network 106. Also for example, mobile device 104 may be implemented as a wireless telephone (e.g., cell phone), personal digital assistant (PDA), or notebook computer.

As seen in FIG. 1, a browser app 108 may run on mobile device 104 and may be used to provide a user interface to permit user 102 to browse information available over network 106. For example, browser app 108 may be implemented as a web browser to view information available over network 106. In one implementation, browser app 108 may comprise a software program such as a graphical user interface (GUI) executable by a processor that is configured to interface and communicate with merchant 130 and service provider 120 via network 106. For example, user 102 may access merchant websites via merchant 130 to find and purchase items. User 102, through client mobile device 104, may also communicate with service provider server 122 to create an account and make a payment to the merchant 130 via service provider 120. Mobile device 104 may include other apps 110 as may be desired to make additional features available to user 102, including making quick payments with service provider server 122. For example, apps 110 may include interfaces and communication protocols that allow the user 102 to receive and transmit information through online sites via network 106. Apps 110 may also include security applications for implementing client-side security features, programmatic client applications for interfacing with appropriate application programming interfaces (APIs) over network 106 and various other types of generally known programs and applications.

Mobile device 104 may also include applications 112, 114 for enrollment and authentication of the user. For example, application 112 may provide for establishing an account and a secure identity with service provider 120. Application 112 may, for example, establish a biometric identity for the user 102 that connects user 102 with device 104 so that when the user swipes his finger across a fingerprint reader (for example) on the device, the user's fingerprint is established as an ID for the device 104 and as an ID for an account with service provider 120 so that application 112 may provide enrollment with SP 120. The handset maker (e.g., manufacturer of device 104) may provide this functionality, but it could also be provided by an operating system (OS) provider or a service provider (such as SP 120 or a trusted service manager (TSM)). The enrollment process may include a number of various aspects that allow for future risk management by SP 120. Many of the parameters needed to create or allow the master token may be pre-determined (e.g., at enrollment) and each SP can then use all or most of these "shared" parameters to be included into the generation of their sub-token. The parameters pre-determined at enrollment may be used like a "checklist" or "shopping list" for preset parameters in the master token. When the user makes a subsequent purchase, for example, a decision whether or not to require extra security could be triggered by parameters available from the master token or sub-token and based on risk parameters pre-determined by the service provider."

Application 114 may, for example, provide authentication for the user 102 and device 104 by verifying the user's fingerprint (for example) when the user 102 subsequently logs in to device 104.

Merchant 130 may be a service provider (for example, a merchant site, an auction site, a marketplace, or a social networking site including P2P money transfer or any other P2P-like information transfer) offering various items such as products or services through their website. Merchant 130 (which could be any representative or employee of the merchant) may process online transactions from consumers making purchases through the merchant site from mobile devices. Merchant 130 also may operate a merchant server 132 capable of handling various on-line transactions automatically, for example, by communicating over network 106 with client mobile device 104 and service provider server 122. Merchant server 132 may run a purchase app 134 for offering products or services for purchase. Merchant server 132 may also run a browser app 136 and other applications 138. Browser app 136 and other applications 138 may enable the merchant to access a service provider 120 web site and communicate with service provider server 122; for example, to convey and receive information to allow a quick payment through the service provider 120. In accordance with one or more embodiments, consumers (e.g., user 102) may access apps for making transactions (e.g., payments) with a merchant 130 through a service provider 120) without having to log in, which may enable quicker service (e.g., completing payment processing) with service provider server 132.

Service provider 120 may be an online payments provider, for example, providing processing for online financial and information transactions with a merchant 130 on behalf of a user 102. Service provider server 122 may include one or more identity apps 124, which may be adapted to interact with the client mobile device 104 as well as merchant server 132 over network 106 to facilitate the purchase of items, products, and services by user 102. Service provider server 122 may be configured to maintain multiple user and merchant accounts in an account database 126; each merchant account may include or be separate from account information 128 associated with individual users, including user 102 and one or more merchants 130. For example, account information 128 may include identity information of user 102 and merchants 130, such as one or more full names, business names, street addresses, email addresses and phone numbers, website addresses, or other types of financial information, which may be used to facilitate online transactions between user 102 and merchants 130. Account information 128 or identity app 124 may also include device identifiers (e.g., unique device identifier present on the device, as described above, such as IMEI number) for user devices such as mobile device 104. Thus, identity app 124 may be configured to interact with a merchant server 132, a user 102, mobile device 104, or other payee to process, obtain, and store information for allowing quick payments.

Email service provider 140 may provide email service for entities connected to the network 106, such as merchant 130, service provider 102, and individuals such as user 102. Email service provider 140 also may operate an email server 142 capable of providing email service automatically, for example, by communicating over network 106 with client mobile device 104, service provider server 122, merchant server 132, and social networking server 152. Email server 142 may run an email app 144 for providing email service. Email server 142 may also run other applications 148.

Social networking service 150 may provide social network for individuals (and possibly other entities) connected to the network 106, such as user 102. Social networking service 150 also may operate a server 152 on which may run a networking app 154, which could, for example, provide a social networking website for access to various subscribers, such as user 102, connected to network 106. Server 152 may also run other applications 158 for providing social networking services and website access.

Figure 2:
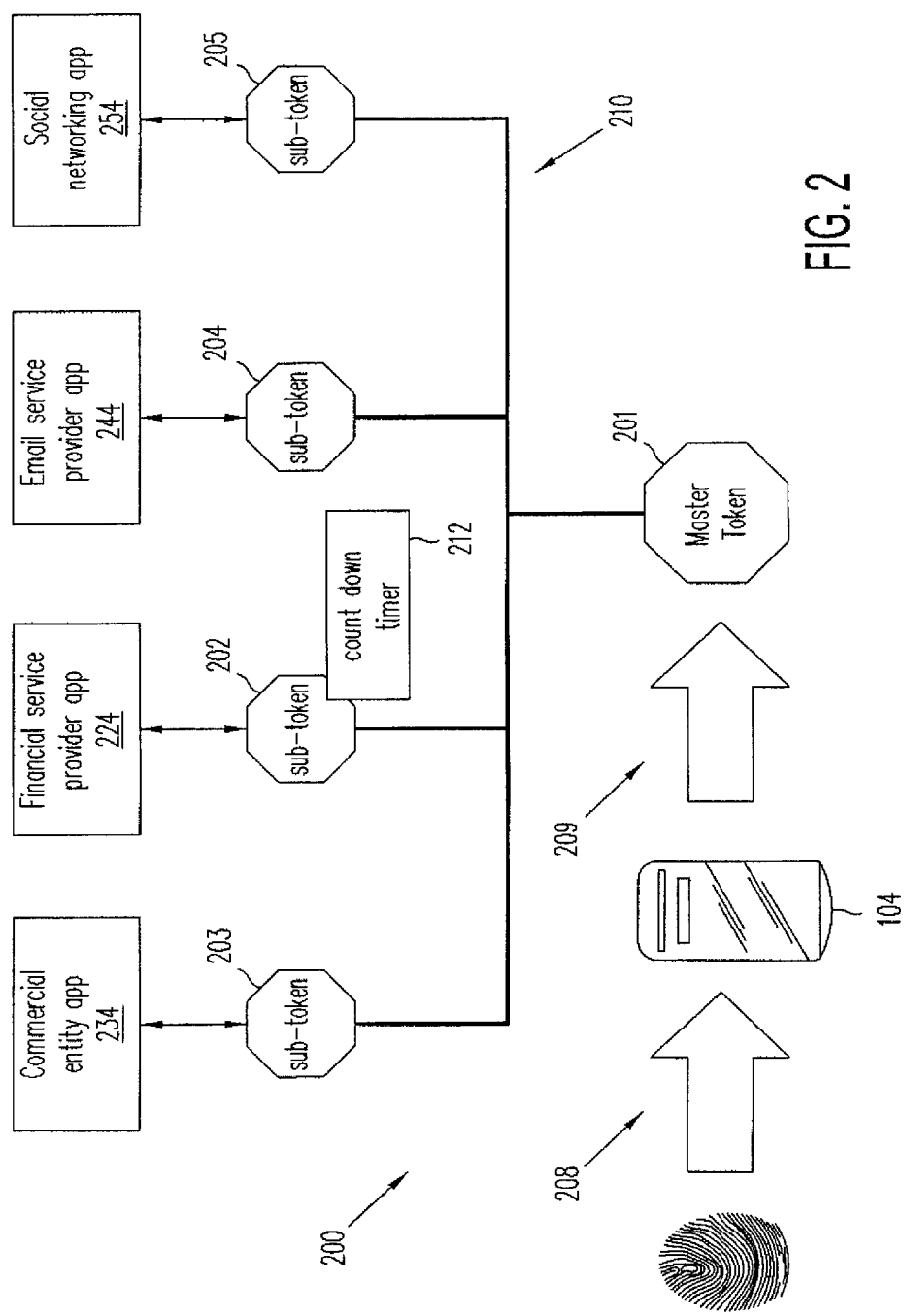
FIG. 2 is a block diagram illustrating a mechanism for score based fast login using sub-tokens for login to multiple apps and communicating over a network in accordance with one or more embodiments.

FIG. 2 illustrates a mechanism 200 for score based fast login using sub-tokens for login to multiple apps and communicating over a network in accordance with one or more embodiments. As seen in FIG. 2, a user (e.g., user 102) may provide a biometric input 208 to a user device 104, which may be enabled for biometrics. For example, the user may swipe his fingerprint on a mobile device having a fingerprint reading capability. Use of biometrics comprises a strong authentication of the user that can be performed for unlocking the phone (instead of, for example, a PIN).

In response to the biometric input 208, a master token 201 may be generated (at response 209) with some control parameters (e.g., parameters for time, scope, field of applicability, settings). When the master token 201 is generated using the parameters, a score may be derived that may be associated with the master token 201. For example, knowing the device ID, the user fingerprint read quality, the number of times the fingerprint has been recognized, the location (e.g., from GPS (geographical positioning system) on the device 104), and so forth, the quality of the master token may be higher or lower and could generate a quality score in the range of 0-100%. For example, an initial score could be 90%, but a bad read, unknown device, or an unusual location could, however, generate a master token 201 to which only a 40% score is attributed. Based on the score, various service providers via their application (e.g., apps 224, 234, 244, 254) could decide if a login is required or can be bypassed. The score may be available on a sub-token corresponding to each app (e.g., sub-tokens 202, 203, 204, 205, respectively to apps 224, 234, 244, 254).

With the master token 201 and its associated score, a service provider or other entity (e.g., commercial entity 130, service provider 120, email service provider 140, social networking service 150) could allow their applications (e.g., commercial entity app 234, service provider app 224, email service provider app 244, social networking app 254, respectively) running on the OS of the device (e.g., device 104) that has been validated to leverage the authenticated (e.g., now known) user and the master token 201 to generate a sub-token to automatically launch some of the functions in the apps flow based on the score or quality of the master token 201. The quality score associated to a master token 201 may also allow processing in a manner that lightens the processing load at the OS level and may speed up the login and sub-token generation.

The master token 201 may be stored on device 104 and may have provisions for linking it into a tree data structure 210, as shown in FIG. 2, which may also be stored in memory on device 104. The master token 201 may be stored in a trusted or secure area on device 104, for example, using a tamper-resistant component, cryptographic protection, or other similar secure technology. The tree data structure 210 and sub-tokens may be similarly protected.

As shown in FIG. 2, master token 201 may be stored as a root token of tree 210 and subsequently generated sub-tokens (e.g., sub-tokens 202, 203, 204, 205) may be linked to the master token 201 forming tree 210. As seen in FIG. 2, sub-tokens 202-205 appear as "leaves" but tree 210 may also have intermediate, e.g., non-leaf, nodes in some embodiments.

As shown in FIG. 2, each sub-token may be created for a particular app on device 104 and may be used only by the app for which the sub-token has been created. For example, sub-token 203 belongs to commercial entity app 234, running on device 104 and which may be used to interact with commercial entity 130 by communicating with purchase app 134. Similarly, sub-token 202 belongs to financial service provider app 224, and so forth as seen in FIG. 2. Each sub-token may be created for its particular app by a service provider app (e.g., app 112 or app 114) which may be running on device 104 and which may be the same app which generates the master token 201. Alternatively, each app may create its own sub-token using permissions and access granted to the master token 201. For example, app 234 may create sub-token 203, app 224 may create sub-token 202, app 244 may create sub-token 204, and app 254 may create sub-token 205. Creation of sub-tokens may be facilitated by the use of an API for each app, e.g., apps 234, 224, 244, 254, including the "master" service provider app, e.g., apps 112, 114.

A sub-token may be endowed with special features such as countdown timer 212 associated with sub-token 202 for financial service provider app 224. In such an instance, it may be desirable for the "master" service provider app, rather than the sub-token's own app, to create the sub-token to ensure that special features cannot overstep the boundaries provided by the master token. For example, the countdown timer for the sub-token 202 would not be allowed to have a total time greater than the expiration time for the master token 201, and that could be enforced by allowing only the "master" service provider app, e.g., apps 112, 114, to create sub-token 202 and not allowing the app 224 to create its own sub-token.

Figure 3:
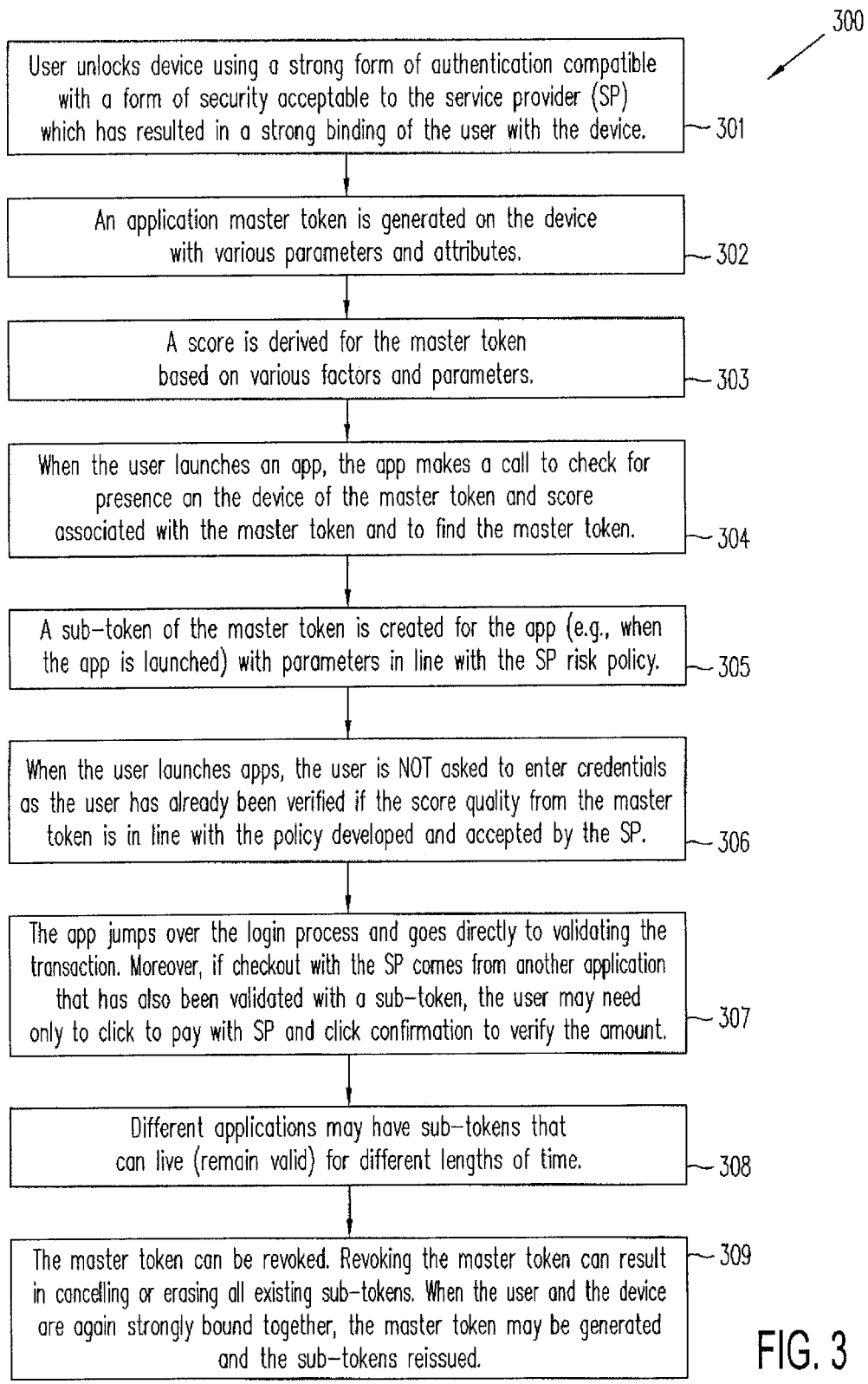
FIG. 3 is a process flow diagram illustrating a method for score based fast login using sub-tokens for login to multiple apps and communicating over a network in accordance with one or more embodiments.

FIG. 3 illustrates a method 300 for score based fast login using sub-tokens for login to multiple apps and communicating over a network in accordance with one or more embodiments. At step 301 of method 300, a user (e.g., user 102) may unlock a device (e.g., device 104) using a strong form of authentication such as biometric technology. For example, the user may swipe a finger across a fingerprint reader to unlock the device, or may give a voice sample or other form of security acceptable to a service provider (SP) resulting in strong binding of the user with the device.

At step 302, an application master token (e.g., master token 201) may be generated on the device with some control parameters (e.g., expiration time, scope, field of applicability, settings for various parameters).

At step 303, a score of the quality of the master token may be derived for the master token based on quality of various parameters, e.g., device ID, the user fingerprint read quality, the number of times this fingerprint has been recognized, the device location, and historical data kept by the SP, for example.

At step 304, when the user launches an app, the app may make a call (in the background) to check for presence on the device of the master token, the score associated with the master token, and to find the master token and its quality score. Alternatively, these steps may be performed, as described above by a "master" service provider app, e.g., enrollment app 112 or authentication app 114.

At step 305, a sub-token (e.g., sub-token 202, 203, 204, 205) may be created for the app (e.g., when the app is launched) with parameters in line with the SP risk policy (e.g., timed, expiration period, active mode period).

At step 306, when the user launches apps (e.g., any of apps 224, 234, 244, 254), the user may be NOT asked to enter credentials (e.g., phone number and PIN or email and password) as the user has already been verified if the quality score from the master token 201 is in line with the policy developed and accepted by the SP. For example, financial service provider app 224 may require a 99% score while social networking app 254 may require only an 80% score.

At step 307, the app may jump over the login process and go directly to validating a transaction. The transaction may be a purchase, in the case, for example of shopping at merchant entity, e.g., using commercial entity app 234. Moreover, if a shopping checkout process using the service provider 120 comes from another application (e.g., social networking app 254) that has also been validated with a sub-token, the user may just click to pay using the service provider 120 and, to verify the amount, click for confirmation.

At step 308, different applications (e.g., apps 224, 234, 244, 254) may have sub-tokens (e.g., sub-tokens 202, 203, 204, 205, respectively) that can live (remain valid) for different lengths of time and for lengths of time different than that for the master token 201. For example, a longer time may be allowed because of lesser security requirement or less privacy concerns from one app to another and such a decision could be based on a lower score from the master token. For example, if the master token 201 currently has a lower score than previously, apps may opt for their sub-tokens to remain valid for a shorter period of time to offset a greater perceived risk of the lower master token quality score.

At step 309, the master token can be revoked—for example, if there is a discrepancy with a user biometric input versus the user biometric enrollment, the device has been off-grid for too long, or an update was done to an application. Revoking the master token can result in canceling or erasing all existing sub-tokens. When the user and the device are again strongly bound together (e.g., the user has logged back in to the device with a satisfactory biometric input 208), the master token 201 may be generated and the sub-tokens reissued.

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as a processing component (e.g., processor, microcontroller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In one embodiment, a disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Logic may be encoded in a computer readable and executable medium, which may refer to any medium that participates in providing instructions to the processor for execution. Such a medium may take many forms, including but not limited to, non-volatile media, volatile media, and transmission media. In one embodiment, the computer readable medium is non-transitory. In various implementations, non-volatile media includes optical or magnetic disks, such as disk drive component, volatile media includes dynamic memory, such as system memory component, and transmission media includes coaxial cables, copper wire, and fiber optics, including wires that comprise bus. In one example, transmission media may take the form of acoustic or light waves, such as those generated during radio wave and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted to read.

In various embodiments, execution of instruction sequences for practicing the invention may be performed by a computer system. In various other embodiments, a plurality of computer systems coupled by a communication link (e.g., LAN, WLAN, PTSN, or various other wired or wireless networks) may perform instruction sequences to practice the invention in coordination with one another.

Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A system, comprising:
one or more processors, one or more computer-readable memories, with program instructions stored on the one or more computer-readable memories, the one or more processors configured to execute the program instructions to cause the system to perform the operations comprising:
receiving authentication information from a user device of a user, wherein the authentication information is received as part of an authentication process corresponding to a first application;
generating a master token, wherein the master token corresponds to a quality level associated with the authentication information; and
in response to detecting a request, from the user device, to access a second application, determining that the quality level of the master token exceeds a threshold level associated with the second application, and based on determining that the quality level of the master token exceeds the threshold level associated with the second application, completing an authentication of the user with the second application using the master token.

2. The system of claim 1, the operations further comprising:
in response to detecting a request to access a third application, determining that the quality level of the master token does not exceed a threshold level associated with the third application, and based on determining that the quality level of the master token does not exceed the threshold level associated with the third application, requesting authentication information from the user.

3. The system of claim 1, the operations further comprising:
in response to the determining that the quality level of the master token exceeds a threshold level associated with the second application, generating a first sub-token based on the master token, wherein the first sub-token corresponds to the second application, and wherein the first sub-token is utilized to complete the authentication of the user with the second application.

4. The system of claim 1, the operations further comprising:
generating a second sub-token based on the master token, wherein the second sub-token corresponds to the first application.

5. The system of claim 1, wherein the quality level associated with the authentication information is based on a type of authentication information provided by the user.

6. The system of claim 5, wherein the quality level associated with the authentication information is further based on a number of times the authentication information has been verified or a location of the user device when the authentication information was received.

7. The system of claim 1, wherein the master token is stored on the user device.

8. A method comprising:
receiving, by a computer system, authentication information from a user device of a user, wherein the authentication information is received as part of an authentication process corresponding to a first application;
generating, by the computer system, a master token, wherein the master token corresponds to a quality level associated with the authentication information; and
in response to detecting a request, from the user device, to access a second application, determining, by the computer system, that the quality level of the master token exceeds a threshold level associated with the second application, and based on determining that the quality level of the master token exceeds the threshold level associated with the second application, completing, by the computer system, an authentication of the user with the second application using the master token.

9. The method of claim 8, further comprising:
in response to detecting a request to access a third application, determining, by the computer system, that the quality level of the master token does not exceed a threshold level associated with the third application, and based on determining that the quality level of the master token does not exceed the threshold level associated with the third application, requesting, by the computer system, authentication information from the user.

10. The method of claim 8, further comprising:
in response to the determining that the quality level of the master token exceeds a threshold level associated with the second application, generating, by the computer system, a first sub-token based on the master token, wherein the first sub-token corresponds to the second application, and wherein the first sub-token is utilized to complete the authentication of the user with the second application.

11. The method of claim 8, further comprising:
generating, by the computer system, a second sub-token based on the master token, wherein the second sub-token corresponds to the first application.

12. The method of claim 8, wherein the quality level associated with the authentication information is based on a type of authentication information provided by the user.

13. The method of claim 12, wherein the quality level associated with the authentication information is further based on a number of times the authentication information has been verified or a location of the user device when the authentication information was received.

14. The method of claim 8, wherein the master token is stored on the user device.

15. A computer program product comprising:
one or more computer-readable tangible storage devices, and program instructions stored on at least one of the one or more computer-readable tangible storage devices, the program instructions when executed cause a machine to perform operations comprising:
receiving authentication information from a user device of a user, wherein the authentication information is received as part of an authentication process corresponding to a first application;
generating a master token, wherein the master token corresponds to a quality level associated with the authentication information, and wherein the master token is stored on the user device; and
in response to detecting a request, from the user device, to access a second application, determining that the quality level of the master token exceeds a threshold level associated with the second application, and based on determining that the quality level of the master token exceeds the threshold level associated with the second application, completing an authentication of the user with the second application using the master token.

16. The computer program product of claim 15, the operations further comprising:
in response to detecting a request to access a third application, determining that the quality level of the master token does not exceed a threshold level associated with the third application, and based on determining that the quality level of the master token does not exceed the threshold level associated with the third application, requesting authentication information from the user.

17. The computer program product of claim 15, the operations further comprising:
in response to the determining that the quality level of the master token exceeds a threshold level associated with the second application, generating a first sub-token based on the master token, wherein the first sub-token corresponds to the second application, and wherein the first sub-token is utilized to complete the authentication of the user with the second application.

18. The computer program product of claim 15, the operations further comprising:
generating a second sub-token based on the master token, wherein the second sub-token corresponds to the first application.

19. The computer program product of claim 15, wherein the quality level associated with the authentication information is based on a type of authentication information provided by the user.

20. The computer program product of claim 19, wherein the quality level associated with the authentication information is further based on a number of times the authentication information has been verified or a location of the user device when the authentication information was received.

* * * * *